(12) United States Patent
Pardee et al.

(10) Patent No.: US 8,499,916 B2
(45) Date of Patent: Aug. 6, 2013

(54) ROTATIONAL COUPLING DEVICE WITH FLUX LEAKAGE PATH INSULATOR

(75) Inventors: James A. Pardee, Janesville, WI (US); Michael Humy, Rockford, IL (US)

(73) Assignee: Warner Electric Technology LLC, Braintree, MA (US)

( * ) Notice: Subject to any disclaimer, the term of this patent is extended or adjusted under 35 U.S.C. 154(b) by 185 days.

(21) Appl. No.: 13/182,921

(22) Filed: Jul. 14, 2011

(65) Prior Publication Data

US 2013/0015033 A1   Jan. 17, 2013

(51) Int. Cl.
*F16D 27/112* (2006.01)
*F16D 27/14* (2006.01)
*F16D 67/06* (2006.01)

(52) U.S. Cl.
USPC ................................. 192/84.961; 192/18 B (58) Field of Classification Search
None
See application file for complete search history.

(56) References Cited

U.S. PATENT DOCUMENTS

| | | | |
|---|---|---|---|
| 2,375,783 A * | 5/1945 | Gilfillan | 192/84.961 |
| 3,172,514 A * | 3/1965 | Hansen | 192/84.96 |
| 4,938,327 A | 7/1990 | Tominaga | |
| 5,033,595 A | 7/1991 | Pardee | |
| 5,119,918 A | 6/1992 | Pardee | |
| 5,252,874 A | 10/1993 | Viegas | |
| 5,285,882 A | 2/1994 | Pardee | |
| 5,305,865 A | 4/1994 | Larson et al. | |
| 5,445,256 A | 8/1995 | Tabuchi et al. | |
| 5,549,186 A | 8/1996 | Pardee | |
| 5,971,121 A | 10/1999 | Pardee | |
| 6,578,684 B2 | 6/2003 | Yamamoto et al. | |
| 6,634,344 B2 | 10/2003 | Stretch | |
| 6,997,294 B2 | 2/2006 | Ochiai et al. | |
| 7,152,721 B2 | 12/2006 | Goto et al. | |
| 7,493,996 B2 | 2/2009 | Pardee | |
| 7,527,134 B2 | 5/2009 | Pardee | |
| 7,654,375 B2 | 2/2010 | Okada et al. | |
| 7,732,959 B2 | 6/2010 | Pardee | |
| 7,975,818 B2 | 7/2011 | Pardee | |

(Continued)

FOREIGN PATENT DOCUMENTS

| | | |
|---|---|---|
| JP | 2003708 | 1/1990 |
| JP | 9042322 | 2/1997 |

(Continued)

OTHER PUBLICATIONS

English language abstract of JP 2-003708.

(Continued)

*Primary Examiner* — Rodney Bonck
(74) *Attorney, Agent, or Firm* — Dykema Gossett PLLC (57) ABSTRACT

A rotational coupling device is provided that minimizes flux leakage from a magnetic circuit that engages the device. The device includes a rotor and an armature defining opposed engagement surfaces. The rotor, the armature and a field shell disposed on one side of the rotor and housing an electrical conductor comprise members of a magnetic circuit that, upon energization of the conductor, draws the armature into engagement with the rotor. A torque transmission member is coupled to the armature and supported by a bearing. In one embodiment a sleeve is disposed radially inwardly of the bearing. To prevent flux leakage through the torque transmission member, the sleeve has a magnetic permeability that is lower than a magnetic permeability of the members of the magnetic circuit. In another embodiment, a support cup of the torque transmission member has a radially outwardly turned flange to distance the cup from the rotor.

20 Claims, 3 Drawing Sheets

U.S. PATENT DOCUMENTS

| | | |
|---|---|---|
| 2004/0016617 A1 | 1/2004 | Imai et al. |
| 2007/0209896 A1 | 9/2007 | Pardee |
| 2008/0110717 A1 | 5/2008 | Toyama et al. |
| 2009/0014271 A1 | 1/2009 | Matsumoto |
| 2009/0229941 A1 | 9/2009 | Pardee |
| 2009/0321214 A1 | 12/2009 | Hoshino et al. |
| 2010/0116616 A1 | 5/2010 | Pardee et al. |

FOREIGN PATENT DOCUMENTS

| | | |
|---|---|---|
| JP | 2002048157 | 2/2002 |
| JP | 2005140219 | 6/2005 |
| JP | 2006132768 | 5/2006 |
| JP | 2006349107 | 12/2006 |
| JP | 2009008172 | 1/2009 |

OTHER PUBLICATIONS

English language abstract of JP 9-042322.
English language abstract of JP 2002--048157.
English language abstract of JP 2005-140219.
English language abstract of JP 2006-132768.
English language abstract of JP 2006-349107.
English language abstract of JP 2009-008172.
International Search Report issued in corresponding International (PCT) Patent Application No. PCT/US2012/045007 (Sep. 21, 2012).
Written Opinion issued in corresponding International (PCT) Patent Application No. PCT/US2012/045007 (Sep. 21, 2012).

\* cited by examiner

ROTATIONAL COUPLING DEVICE WITH FLUX LEAKAGE PATH INSULATOR

BACKGROUND OF THE INVENTION

1. Field of the Invention

This invention relates to rotational coupling devices such as brakes and clutches and, in particular, to a rotational coupling device having structure to reduce flux leakage from the magnetic circuit used to engage the device.

2. Discussion of Related Art

Rotational coupling devices such as clutches and brakes are used to control transfer of torque between rotational bodies. One type of conventional device is illustrated in commonly assigned U.S. Pat. Nos. 5,119,918, 5,285,882, 5,971,121, 7,493,996, 7,527,134, and 7,732,959 and U.S. Published Patent Application Nos. 2006-0278491, 2009-0229941 and 2010-0116616, the entire disclosures of which are incorporated herein by reference. This device includes a rotor that is coupled to a shaft for rotation with the shaft about a rotational axis. A field shell is also disposed about the axis on one side of the rotor and is fixed against rotation. The field shell defines radially spaced, axially extending inner and outer poles between which an electrical conductor is disposed, facing the rotor. A brake plate is coupled to the field shell and axially spaced from the field shell. The brake plate is disposed on a side of the rotor opposite the conductor. An armature coupled to a torque transmission member such as a pulley is disposed on the same side of the rotor as the brake plate and is disposed axially between the rotor and the brake plate. The armature is coupled to the torque transmission member by a plurality of leaf springs. Energizing the conductor produces a magnetic circuit in the field shell, rotor and armature that draws the armature into engagement with the rotor and couples the shaft and torque transmission member together for rotation. Upon deenergization of the conductor, the leaf springs draw the armature out of engagement with the rotor and into engagement with the brake plate to brake the armature and torque transmission member. Permanent magnets may also be coupled to the brake plate and used to create another magnetic circuit between the brake plate, the field shell and the armature to assist the leaf springs in braking the armature and torque transmission member.

The magnetic circuit between the field shell, rotor and armature used to engage the coupling device may be weakened by leakage of magnetic flux along various paths. In particular, magnetic flux may leak from the armature and/or brake plate to the adjacent torque transmission member. The flux then travels radially inwardly through all available paths which could include a supporting bearing and possibly the shaft on which the coupling device is mounted before returning to the rotor. This presence of this flux pathway (or leakage circuit) drains magnetic flux from the rotor/armature interface thereby reducing the flux density at the interface and the attractive force between the rotor and armature. As a result, the coupling torque and the wear life of the coupling device is reduced.

The inventors herein have recognized a need for a rotational coupling device that will minimize and/or eliminate one or more of the above-identified deficiencies.

SUMMARY OF THE INVENTION

The present invention provides a rotational coupling device.

A rotational coupling device in accordance with one embodiment of the present invention includes a rotor configured for coupling to a shaft for rotation therewith and disposed about a rotational axis. The rotor defines a first clutch engagement surface. The device further includes a field shell disposed about the rotational axis and fixed against rotation and an electrical conductor disposed within the field shell on a first side of the rotor. The device further includes an armature disposed on a second side of the rotor opposite the conductor. The armature defines a second clutch engagement surface. The armature, the rotor, and the field shell comprise members of a magnetic circuit. The device further includes a torque transmission member coupled to the armature for rotation therewith. The torque transmission member is disposed about the axis and supported by a bearing disposed about the axis. The device further includes a sleeve disposed about the axis radially inwardly of the bearing. The sleeve has a magnetic permeability that is lower than a magnetic permeability of the members of the magnetic circuit.

A rotational coupling device in accordance with another embodiment of the present invention includes a rotor configured for coupling to a shaft for rotation therewith and disposed about a rotational axis. The rotor defines a first clutch engagement surface. The device further includes a field shell disposed about the rotational axis and fixed against rotation and an electrical conductor disposed within the field shell on a first side of the rotor. The device further includes an armature disposed on a second side of the rotor opposite the conductor. The armature defines a second clutch engagement surface. The device further includes a torque transmission member coupled to the armature for rotation therewith. The torque transmission member is disposed about the axis and supported by a bearing disposed about the axis. The torque transmission member includes a support cup having an axially extending portion supported on the bearing and a flange extending radially from the axially extending portion. The device further includes a spring extending between the armature and the flange of the support cup. The flange of the support cup extends radially outwardly from the axially extending portion of the support cup.

A rotational coupling device in accordance with the present invention represents an improvement over conventional devices by reducing or eliminating flux leakage along the pathway through the torque transmission member. In the first embodiment described above, the sleeve acts as a flux insulator along the pathway (or leakage circuit) through the torque transmission member and supporting bearing back to the rotor thereby reducing flux leakage along the pathway. In the second embodiment described above, the radially outwardly turned flange on the support cup of the torque transmission member increases the air gap between the support cup and the shaft and/or rotor thereby reducing the flux leakage along the same pathway.

These and other advantages of this invention will become apparent to one skilled in the art from the following detailed description and the accompanying drawings illustrating features of this invention by way of example.

DETAILED DESCRIPTION OF EMBODIMENTS OF THE INVENTION

Figure 1:
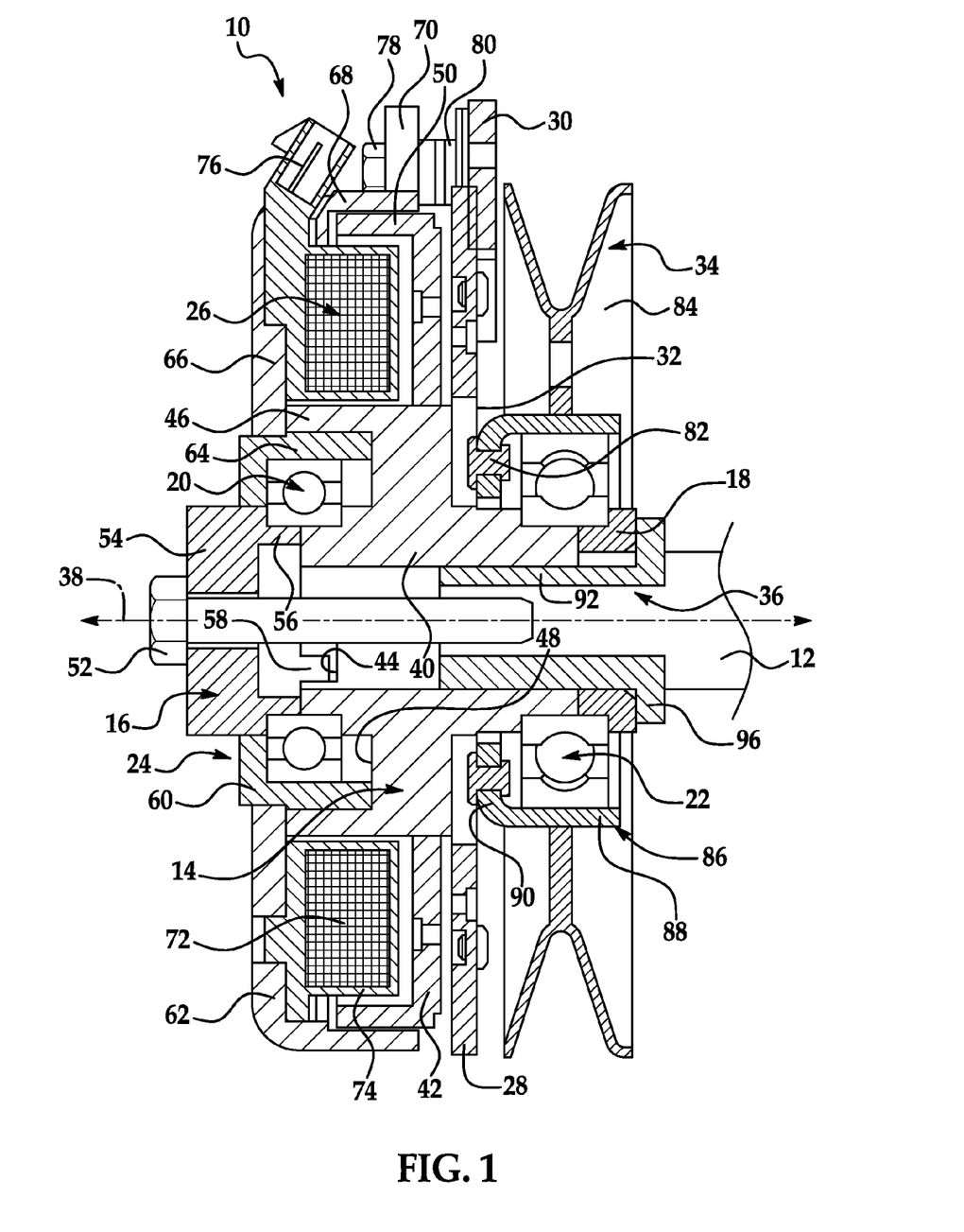
FIG. 1 is a cross-sectional view of a rotational coupling device in accordance with one embodiment of the present invention.

Referring now to the drawings wherein like reference numerals are used to identify identical components in the various views, FIG. 1 illustrates a rotational coupling device 10 in accordance with one embodiment of the present invention. Device 10 functions as a clutch to selectively transfer torque between a shaft 12 and another device (not shown). Device 10 also functions as a brake when torque is not being transferred. Device 10 may be provided for use in a riding lawnmower or similar device. It will be understood by those of ordinary skill in the art, however, that device 10 may be used in a wide variety of applications requiring a clutch and/or brake. Device 10 may include a rotor 14, spacers 16, 18, bearings 20, 22, a field shell 24, an electrical conduction assembly 26, an armature 28, a brake plate 30, springs 32, a torque transmission member 34 and a sleeve 36.

Shaft 12 may function as an input shaft-delivering torque from a device (not shown) from which shaft 12 extends through coupling device 10 to another device (not shown). Alternatively, shaft 12 may function as an output shaft-receiving torque through coupling device 10 from another device (not shown) and transferring that torque to a device (not shown) from which shaft 12 extends. Shaft 12 may be made from conventional metals and metal alloys and may be solid or tubular. Shaft 12 is centered about a rotational axis 38 and may be driven by an engine, electric motor or other conventional power source when functioning as an input shaft. In the illustrated embodiment shaft 12 is inserted into device 10 on the same side of device 10 as torque transmission member 34 ("reverse mount"). It should be understood, however, that the orientation of shaft 12 and spacer 16 could be reversed such that shaft 12 is inserted into device 10 on the opposite side as torque transmission member 34 ("standard mount").

Rotor 14 is provided for selective engagement with armature 28 to transmit torque between shaft 12 and member 34. Rotor 14 is disposed about axis 38 and is coupled to shaft 12 for rotation therewith through sleeve 36. Rotor 14 may be made from conventional metals and metal alloys and includes a hub 40 and a rotor disc 42.

Hub 40 is tubular and defines a central bore into which shaft 12 and sleeve 36 extend. The diameter of the bore (i.e., the inner diameter of hub 40) is substantially the same as the outer diameter of one axial end portion of sleeve 36 and the bore is sized to receive this portion of sleeve 36 therein. Because the diameter of the bore is greater than the outer diameter of shaft 12, to the extent shaft 12 extends beyond the axial end of sleeve 36 an air gap exists between hub 40 and shaft 12 thereby further reducing potential flux leakage through shaft 12. Hub 40 may define an axially extending keyway (not shown) shaped complementary to, and configured to receive, a key (not shown). The keyway may oppose a corresponding keyway in sleeve 36 into which the key extends upon assembly of device 10 onto shaft 12. Alternatively, one of hub 40 and sleeve 36 may be shaped with an integral, radially extending key configured to be received within a keyway in the other of hub 40 and sleeve 36. At either axial end, hub 40 defines shoulders that abut against and supports bearings 20, 22. Further, hub 40 may define one or more notches 44 or lugs disposed in either axial end face of hub 40 configured to engage corresponding notches or lugs in spacers 16, 18 as described in greater detail in U.S. Pat. No. 7,527,134, the entire disclosure of which is incorporated herein by reference. The number, shape and orientation of notches 44 or lugs may vary and the notches or lugs at either end may be in line, or in phase, with one another or phase shifted to allow for improved manufacturing of hub 40 (e.g. each end face may include diametrically opposite notches 44 or lugs with the notches 44 or lugs on one end face phase shifted by 90 degrees relative to the notches 44 or lugs on the opposite end face). At its radially outer diameter, hub 40 defines an axially extending inner rotor pole 46. Hub 40 further defines an axially extending recess 48 radially inwardly of pole 46 for a purpose described hereinbelow.

Disc 42 extends radially outwardly from hub 40 and defines a clutch engagement surface facing armature 28. Disc 42 is coupled to hub 40 through, for example, a press-fit relationship including a plurality of complementary lugs and notches. As is known in the art, disc 42 may include a plurality of radially spaced rows of angularly spaced, banana shaped slots (not shown). Upon energization of conduction assembly 26, the slots cause magnetic flux to travel back and forth between disc 42 and armature 28 across an air gap enabling a high torque engagement between rotor 14 and armature 28. At its outer diameter, disc 42 defines an axially extending outer rotor pole 50. Pole 50 is radially aligned with pole 46 and spaced radially outwardly of pole 46.

Spacer 16 is provided to support field shell 24 in assembled relation with the other components of device 10 and may be made from conventional materials including powdered metals. In accordance with one aspect of the present invention, however, spacer 16 may have a lower magnetic permeability than rotor 14, field shell 24 and armature 28 and may be made from, for example, non-ferromagnetic materials such as certain stainless steels. Spacer 16 is disposed about axis 38 and is generally cylindrical in shape. Spacer 16 is configured to receive a fastener 52 that extends through spacer 16 and into shaft 12. Like spacer 16, in accordance with one aspect of the present invention, fastener 52 has a lower magnetic permeability than rotor 14, field shell 24 and armature 28 and may be made from, for example, non-ferromagnetic materials such as certain stainless steels. Spacer 16 may define a head 54 at one axial end having a plurality of flats that allow spacer 16 to be secured while applying torque to fastener 52. Spacer 16 may further define a body 56 extending axially from head 54. Body 56 has a generally cylindrical outer surface on which bearing 20 may be supported between opposed shoulders defined in rotor hub 40 and spacer 16. Spacer 16 may further define one or more axially projecting lugs 58 or notches in an axial end face of body 56 of spacer 16. Lugs 58 are configured to be received within notches 44 in rotor hub 40 to rotatably couple spacer 16 and rotor hub 40. Lugs 58 may be tapered and may be press fit within notches 44. The number, shape and orientation of lugs 58 or notches may again vary.

Spacer 18 is provided to support bearing 22 and torque transmission member 34 in assembled relation with the other components of device 10 and may be made from conventional materials including powdered metals. In accordance with one aspect of the present invention, however, spacer 18 has a lower magnetic permeability than rotor 14, field shell 24 and armature 28 and may be made from, for example, non-ferromagnetic materials. Spacer 18 is disposed about axis 38 and is generally cylindrical in shape. Spacer 18 has an inner diameter sized to receive sleeve 36 and is supported on sleeve 36 and disposed axially between one axial end of rotor hub 40 and a radially extending flange of sleeve 36. Spacer 18 has a generally cylindrical outer surface on which bearing 22 may be supported between opposed shoulders defined in rotor hub 40 and spacer 18.

Bearing 20 is provided to allow rotation of rotor hub 40 and spacer 16 relative to field shell 24. Bearing 20 is conventional in the art. An inner race of bearing 20 is supported on spacer 16 and rotor hub 40 and abuts opposed shoulders defined in spacer 16 and rotor hub 40. An outer race of bearing 20 supports field shell 24.

Bearing 22 is provided to allow rotation of torque transmission member 34 relative to input shaft 12, rotor 14 and sleeve 36. Bearing 22 is conventional in the art. An inner race of bearing 22 is supported on spacer 18 and rotor hub 40 and abuts opposed shoulders defined in spacer 18 and rotor hub 40. An outer race of bearing 22 supports torque transmission member 34.

Field shell 24 is provided to house conduction assembly 26. Shell 24 also forms part of a magnetic circuit that causes the selective engagement of rotor 14 and armature 28. Field shell 24 may be made from conventional metals and metal alloys, including steel. Shell 24 is cylindrical and is disposed about axis 38 and is supported on an outer race of bearing 20. Shell 24 is fixed against rotation through, for example, a fastener (not shown) extending through a slot (not shown) in shell 24. Shell 24 is generally U-shaped in cross-section and includes radially inner and radially outer annular members 60, 62.

Inner member 60 is supported on an outer race of bearing 20. Member 60 is generally L-shaped in cross-section and defines an axially extending inner pole 64. Pole 64 extends into recess 48 of hub 40 of rotor 14 and is therefore disposed radially inwardly of inner rotor pole 46. As described more fully in commonly assigned U.S. Pat. No. 7,493,996, the entire disclosure of which is incorporated herein by reference, the relative location of poles 46, 64 is advantageous for several reasons. First, the magnetic efficiency of the magnetic circuit involving rotor 14, field shell 24 and armature 28 is improved by reducing the number of air gaps for at least some of the magnetic flux in the circuit. Second, the annular gap in which conduction assembly 26 is disposed is enlarged enabling easier insertion and fastening of assembly 26 within field shell 24.

Outer member 62 is coupled to and supported on inner member 60. Outer member 62 defines an end wall 66, an axially extending outer pole 68, and a flange 70. End wall 66 extends radially outwardly from member 60. Pole 68 is integral with, and extends axially from, end wall 66. Pole 68 is disposed radially outwardly of pole 50 of rotor 14. Flange 70 is integral with, and extends radially outwardly from, pole 68 at an end of pole 68 opposite end wall 66. Flange 70 extends along at least a portion of the circumference of pole 68.

Conduction assembly 26 is provided to create a magnetic circuit among rotor 14, field shell 24, and armature 28 to cause movement of armature 28 into engagement with rotor 14 and transmission of torque between shaft 12 and torque transmission member 34. Conduction assembly 26 is generally annular and is disposed about axis 38 within field shell 24. In particular, assembly 26 is disposed between the inner and outer poles 64, 68 of shell 24. Assembly 26 includes a conductor 72 and a conductor shell 74.

Conductor 72 may comprise a conventional copper coil although other known conductors may alternatively be used. Conductor 72 may be connected electrically to a power supply (not shown) such as a battery. Upon energization of conductor 72, a magnetic circuit is formed between rotor 14, field shell 24, and armature 28. Magnetic flux flows from outer pole 68 of shell 24 across an air gap to outer pole 50 of rotor 14. Flux then travels back and forth between disc 42 and armature 28 across the air gap between them. Flux then flows from disc 42 of rotor 14 to hub 40 of rotor 14. Finally, flux flows from hub 40 back to members 60, 62 of field shell 24 along several paths. In particular, a portion of the flux flows directly from inner rotor pole 46 to outer member 62 of shell 24. Another portion of the flux flows from hub 40 through inner pole 64 of shell 24 defined by inner member 60 before flowing to outer member 62. Still another portion of the flux may flow from hub 40 to spacer 16 (at least in those embodiments wherein spacer 16 is not made from a material having a lower magnetic permeability than structures along alternate paths) radially inwardly of bearing 20 and then to inner member 60 and outer member 62 allowing a portion of the flux to avoid the high density area of inner rotor pole 46 and inner field shell pole 64 and further improving the magnetic efficiency of the circuit.

Conductor shell 74 is provided to house conductor 72 and is also used to mount conductor 72 within field shell 24. Shell 74 may be molded from conventional plastics. Shell 74 may include an integral terminal connector 76 through which conductor 72 may be electrically connected to a power source. Shell 74 may also define one or more lugs sized to be received within recesses in end wall 66 of field shell 24 to prevent rotation of conduction assembly 26. Shell 74 may include a radially outwardly extending flange disposed proximate outer pole 68 of field shell 24 and affixed to shell 24 at a plurality of points as described in commonly assigned pending U.S. patent application Ser. No. 11/150,670, the entire disclosure of which is incorporated herein by reference.

Armature 28 is provided to transmit a braking torque to torque transmission member 34 and to selectively transmit a drive torque between rotor 14 and member 34. Armature 28 may be made form a variety of conventional metals and metal alloys including steel. Armature 28 is annular in construction and disposed about axis 38 and defines a clutch engagement surface facing rotor disc 42. Armature 28 is axially spaced from rotor disc 42 by an air gap. Like rotor disc 42, armature 28 may include a plurality of radially spaced rows of angularly spaced slots (not shown) that facilitate travel of magnetic flux back and forth between rotor 14 and armature 28 upon energization of conduction assembly 26. Armature 28 is coupled to transmission member 34. In particular, armature 28 may be coupled to torque transmission member 34 by a plurality of leaf springs 32.

Brake plate 30 provides a braking surface for engagement by armature 28 to brake torque transmission member 34. Brake plate 30 may be made from conventional materials having a relatively high magnetic permeability including conventional metals and metal alloys such as steel. Brake plate 30 extends about at least a portion of the circumference of device 10, and preferably only a portion of the circumference of device 10, and is coupled to field shell 24. In particular, brake plate 30 is coupled to flange 70 of field shell 24 and suspended therefrom using one or more fasteners 78. Fasteners 78 may be made from a material or materials (including non-magnetic materials) having a magnetic permeability lower that that of rotor 14, field shell 24 and armature 28 to reduce or eliminate flux transfer between brake plate 30 and field shell 24 and thereby facilitate clutch engagement when conduction assembly 26 is energized. Brake plate 30 may be axially spaced from flange 70 of field shell 24 using one or more spacers 80 or shims such as the spacers and shims described in commonly assigned and copending U.S. Published Application No. 2010-0116616, the entire disclosure of which is incorporated herein by reference. Spacers 80 allow for adjustment of the position of brake plate 30 to compensate for wear on the clutch engagement surfaces of rotor 14 and armature 28, respectively and on the brake engagement surfaces of armature 28 and brake plate 30. Spacers 80 may include bores through which fasteners 78 extend. Spacers 80 may likewise be made from a material or materials (including non-magnetic materials) having a relatively lower magnetic permeability than that of rotor 14, field shell 24 and armature 28 to reduce or eliminate flux transfer between brake plate 30 and field shell 24. Referring, for example, to commonly assigned U.S. Pat. No. 7,732,959, plate 30 may house one or more magnets (not shown) and thereby form part of a magnetic circuit with armature 28 and the magnets to assist springs 32 in drawing armature 28 into engagement with brake plate 30 to provide a braking torque to torque transmission member 34.

Springs 32 transmit drive and braking torque from armature 28 to torque transmission member 34 and allow for axial movement of armature 28 relative to member 34 and towards and away from rotor disc 42. Springs 32 may be made from stainless steel and are connected at one end to armature 28 and at an opposite end to member 34 using conventional fasteners 82 such as rivets, screws, bolts, or pins.

Torque transmission member 34 transfers torque between shaft 12 and another device such as a lawnmower blade. Member 34 may include a conventional pulley 84 around which a torque transmitting belt is wound and coupled to the device. Member 34 further includes a support cup 86 on which pulley 84 is supported and from which pulley 84 extends radially outwardly. Cup 86 is supported on an outer race of bearing 22 and includes an axially extending portion 88 and a flange 90 extending radially relative to portion 88. One end of each spring 32 is coupled to flange 90 in a conventional manner using fasteners 82.

Sleeve 36 is a flux insulator and provides a means for reducing flux leakage from the magnetic circuit including rotor 14, field shell 24 and armature 28. In particular, sleeve 36 provides a means for reducing flux leakage along a pathway (or leakage circuit) from armature 28 through torque transmission member 34 into bearing 22, shaft 12 and back to rotor 14. Sleeve 36 is made from materials having a lower magnetic permeability than the members of the magnetic circuit (i.e., rotor 14, field shell 24 and armature 28) including, for example, non-ferromagnetic materials such as an austenitic stainless steel. As a result, more magnetic flux remains at the rotor/armature interface thereby increasing the flux density and force of attraction at the interface. Sleeve 36 is disposed about axis 38 radially inwardly of bearing 22 and is generally cylindrical in shape. Sleeve 36 has an inner diameter sized to received shaft 12. In the illustrated embodiment, sleeve 36 receives a reduced diameter portion of shaft 12 at one axial end of shaft 12. Sleeve 36 may be joined to shaft 12 using a conventional key/keyway relationship. In particular, sleeve 36 may define an axially extending keyway (not shown) shaped complementary to, and configured to receive, a key (not shown). The keyway may oppose a corresponding keyway in shaft 12 into which the key extends upon assembly of sleeve 36 onto shaft 12. Alternatively, one of sleeve 36 and shaft 12 may be shaped with an integral, radially extending key configured to be received within a keyway in the other of sleeve 36 and shaft 12. Sleeve 36 has an outer diameter that varies along the axial length of sleeve 36. In particular, sleeve 36 has one portion 92 with an outer diameter that is sized to be received within recess 18 in a position such that portion of hub 40 and a portion of spacer 18 are both disposed radially between bearing 22 and sleeve 36. Sleeve 36 has a another portion 96 at one axial end with an outer diameter that is greater than the outer diameter of portion 92. Portions 92, 96 together define a shoulder against which one axial end of spacer 18 abuts.

Figure 2:
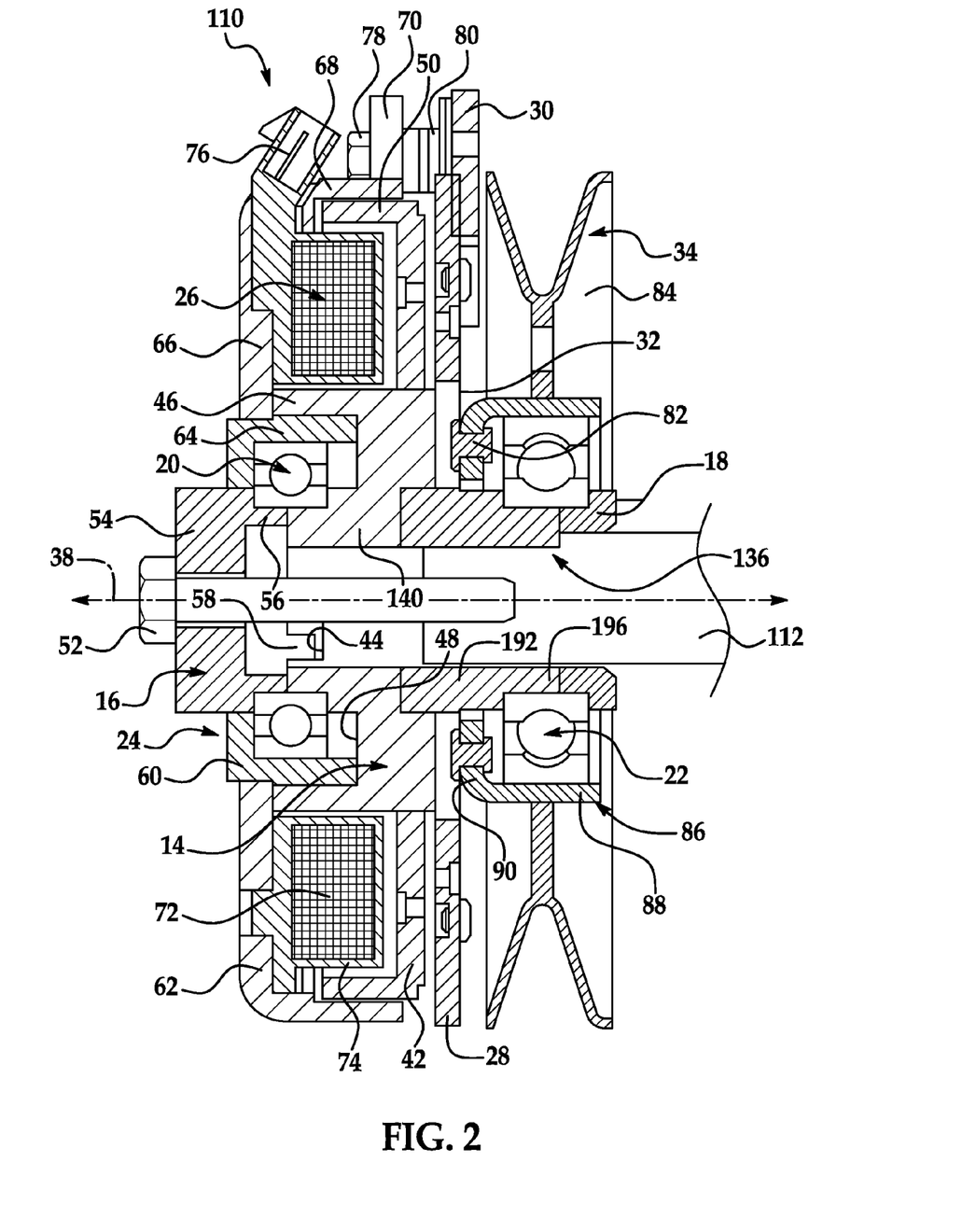
FIG. 2 is a cross-sectional view of a rotational coupling device in accordance with another embodiment of the present invention.

Referring now to FIG. 2, a rotational coupling device 110 in accordance with another embodiment of the present invention is illustrated. Device 110 is similar to device 10. Therefore, like structures are identified with the same reference numbers and a description of like structures may be found hereinabove. Device 110 differs from device 10 in that device 110 includes a sleeve 136 that is disposed axially between a hub 140 of a rotor 114 and spacer 18. Sleeve 136 essentially replaces a portion of the rotor hub such that rotor hub 140 is shortened axially relative to hub 40 from device 10. Sleeve 136 is again a flux insulator and provides a means for reducing flux leakage from the magnetic circuit including rotor 114, field shell 24 and armature 28. In particular, sleeve 136 provides a means for reducing flux leakage along a pathway (or leakage circuit) from armature 28 through torque transmission member 34 into bearing 22, shaft 112 and back to rotor 114. Sleeve 136 is made from materials having a lower magnetic permeability than the members of the magnetic circuit (i.e., rotor 114, field shell 24 and armature 28) including, for example, non-ferromagnetic materials, such as an austenitic stainless steel. As a result, more magnetic flux remains at the rotor/armature interface thereby increasing the flux density and force of attraction at the interface. Sleeve 136 is disposed about axis 38 radially inwardly of bearing 22 and is generally cylindrical in shape. Sleeve 136 has an inner diameter sized to received shaft 112. Sleeve 136 may be joined to shaft 112 using a conventional key/keyway relationship. In particular, sleeve 136 may define an axially extending keyway (not shown) shaped complementary to, and configured to receive, a key (not shown). The keyway may oppose a corresponding keyway in shaft 112 into which the key extends upon assembly of sleeve 136 onto shaft 112. Alternatively, one of sleeve 136 and shaft 112 may be shaped with an integral, radially extending key configured to be received within a keyway in the other of sleeve 136 and shaft 112. Sleeve 136 has an outer diameter that varies along the axial length of sleeve 136. In particular, sleeve 136 has one portion 192 at one axial end with an outer diameter that is sized to be received within a recess formed in an axial end face of rotor hub 140. Sleeve 136 has a another portion 196 at one axial end with an outer diameter that is smaller than the outer diameter of portion 192. Portions 192, 196 together define a shoulder against which one axial end of bearing 22 abuts.

Figure 3:
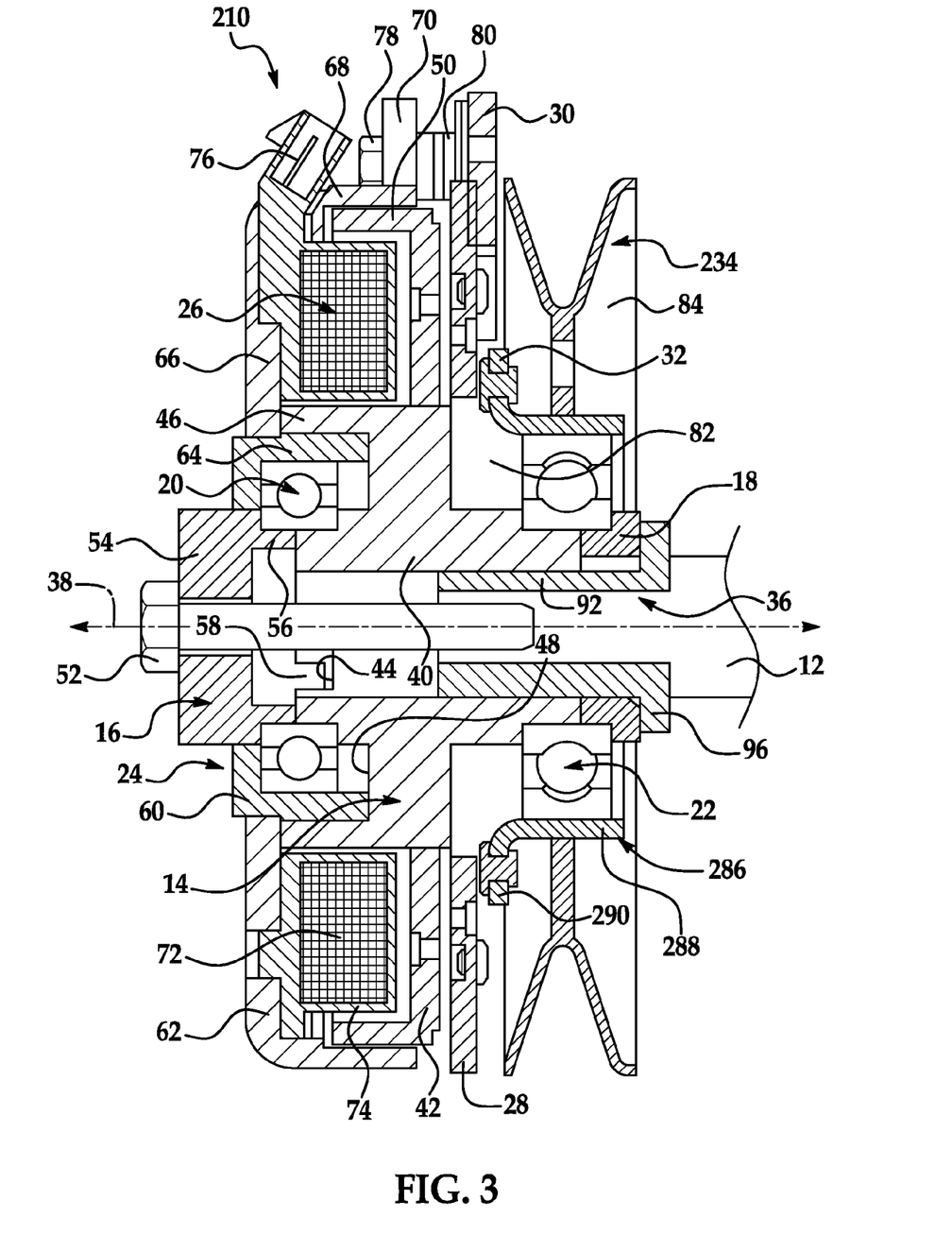
FIG. 3 is a partial cross-sectional view of a rotational coupling device in accordance with another embodiment of the present invention.

Referring now to FIG. 3, a rotational coupling device 210 in accordance with another embodiment of the present invention is illustrated. Device 210 is similar to devices 10 and 110. Therefore, like structures are identified with the same reference numbers and a description of like structures may be found hereinabove. Device 210 differs from device 10 and 110 in that the torque transmission member 234 of device 210 includes a support cup 286 having a flange 290 that extends radially outwardly from the axially extending portion 288 of cup 286. Because flange 290 extends radially outwardly, the air gap between flange 290 and rotor hub 40 and shaft 12 is increased. As a result, more magnetic flux remains at the rotor/armature interface thereby increasing the flux density and force of attraction at the interface.

A rotational coupling device in accordance with the present invention represents an improvement over conventional devices by reducing or eliminating flux leakage along the pathway through the torque transmission member. In several embodiments described above, the sleeve 36 or 136 acts as a flux insulator along the pathway (or leakage circuit) from armature 28 through the torque transmission member 34 and supporting bearing 22 and shaft 12 back to the rotor 14 or 114 thereby reducing flux leakage along the pathway. In other embodiments described above, the radially outwardly turned flange 290 on the support cup 286 of the torque transmission member 234 increases the air gap between the support cup 286 and the shaft 12 and/or rotor 14 and/or is made from materials having a relatively low magnetic permeability thereby reducing the flux leakage along the same pathway.

While the invention has been shown and described with reference to one or more particular embodiments thereof, it will be understood by those of skill in the art that various changes and modifications can be made without departing from the spirit and scope of the invention.

We claim:

1. A rotational coupling device, comprising:
   a rotor configured for coupling to a shaft for rotation therewith and disposed about a rotational axis, said rotor defining a first clutch engagement surface;
   a field shell disposed about said rotational axis and fixed against rotation;
   an electrical conductor disposed within said field shell on a first side of said rotor;
   an armature disposed on a second side of said rotor opposite said conductor, said armature defining a second clutch engagement surface, said armature, said rotor, and said field shell comprising members of a magnetic circuit;
   a torque transmission member coupled to said armature for rotation therewith, said torque transmission member disposed about said axis and supported by a bearing disposed about said axis; and,
   a sleeve disposed about said axis radially inwardly of said bearing
   wherein said sleeve has a magnetic permeability that is lower than a magnetic permeability of said members of said magnetic circuit; and,
   a spacer disposed about said axis radially inwardly of said bearing, said spacer having a magnetic permeability that is lower than said magnetic permeability of said members of said magnetic circuit.

2. The rotational coupling device of claim 1, wherein said spacer is disposed radially between said sleeve and said bearing.

3. The rotational coupling device of claim 1, wherein said sleeve is disposed axially between said spacer and said rotor.

4. The rotational coupling device of claim 1, wherein said torque transmission member comprises a pulley.

5. The rotational coupling device of claim 4, wherein said pulley has a magnetic permeability that is lower than said magnetic permeability of said members of said magnetic circuit.

6. The rotational coupling device of claim 1, wherein said torque transmission member includes a support cup having an axially extending portion supported on said bearing and a flange extending radially outwardly from said axially extending portion and further comprising a spring extending between said armature and said flange of said support cup.

7. The rotational coupling device of claim 1, further comprising:
   another spacer disposed about said axis; and,
   a fastener extending through said another spacer and configured to engage said shaft
   wherein at least one of said another spacer and said fastener has a magnetic permeability that is lower than said magnetic permeability of said members of said magnetic circuit.

8. The rotational coupling device of claim 7 wherein a portion of said rotor is disposed radially between said sleeve and said bearing and is supported on said sleeve.

9. The rotational coupling device of claim 8 wherein said torque transmission member includes a support cup having an axially extending portion supported on said bearing and a flange extending radially outwardly from said axially extending portion and further comprising a spring extending between said armature and said flange of said support cup.

10. The rotational coupling device of claim 8 wherein said torque transmission member comprises a pulley.

11. The rotational coupling device of claim 10, wherein said pulley has a magnetic permeability that is lower than said magnetic permeability of said members of said magnetic circuit.

12. The rotational coupling device of claim 1 wherein a portion of said rotor is disposed radially between said sleeve and said bearing and is supported on said sleeve.

13. A rotational coupling device, comprising:
   a rotor configured for coupling to a shaft for rotation therewith and disposed about a rotational axis, said rotor defining a first clutch engagement surface;
   a field shell disposed about said rotational axis and fixed against rotation;
   an electrical conductor disposed within said field shell on a first side of said rotor;
   an armature disposed on a second side of said rotor opposite said conductor, said armature defining a second clutch engagement surface, said armature, said rotor, and said field shell comprising members of a magnetic circuit;
   a torque transmission member coupled to said armature for rotation therewith, said torque transmission member disposed about said axis and supported by a bearing disposed about said axis; and,
   a sleeve disposed about said axis radially inwardly of said bearing
   wherein said sleeve has a magnetic permeability that is lower than a magnetic permeability of said members of said magnetic circuit;
   a spacer disposed about said axis; and,
   a fastener extending through said spacer and configured to engage said shaft
   wherein at least one of said spacer and said fastener has a magnetic permeability that is lower than said magnetic permeability of said members of said magnetic circuit.

14. The rotational coupling device of claim 13 wherein said torque transmission member includes a support cup having an axially extending portion supported on said bearing and a flange extending radially outwardly from said axially extending portion and further comprising a spring extending between said armature and said flange of said support cup.

15. The rotational coupling device of claim 13 wherein said torque transmission member comprises a pulley.

16. The rotational coupling device of claim 15, wherein said pulley has a magnetic permeability that is lower than said magnetic permeability of said members of said magnetic circuit.

17. A rotational coupling device, comprising:
   a rotor configured for coupling to a shaft for rotation therewith and disposed about a rotational axis, said rotor defining a first clutch engagement surface;
   a field shell disposed about said rotational axis and fixed against rotation;
   an electrical conductor disposed within said field shell on a first side of said rotor;

an armature disposed on a second side of said rotor opposite said conductor, said armature defining a second clutch engagement surface, said armature, said rotor, and said field shell comprising members of a magnetic circuit;

a torque transmission member coupled to said armature for rotation therewith, said torque transmission member disposed about said axis and supported by a bearing disposed about said axis; and, a sleeve disposed about said axis radially inwardly of said bearing wherein said sleeve has a magnetic permeability that is lower than a magnetic permeability of said members of said magnetic circuit;

wherein a portion of said rotor is disposed radially between said sleeve and said bearing and is supported on said sleeve.

18. The rotational coupling device of claim 17 wherein said torque transmission member includes a support cup having an axially extending portion supported on said bearing and a flange extending radially outwardly from said axially extending portion and further comprising a spring extending between said armature and said flange of said support cup.

19. The rotational coupling device of claim 17 wherein said torque transmission member comprises a pulley.

20. The rotational coupling device of claim 19, wherein said pulley has a magnetic permeability that is lower than said magnetic permeability of said members of said magnetic circuit.

* * * * *